US008896987B2

(12) United States Patent  
Kämpfer et al.

(10) Patent No.: US 8,896,987 B2  
(45) Date of Patent: Nov. 25, 2014

(54) UNDERGROUND TRANSFORMER STATION FOR HIGH AND MEDIUM VOLTAGE

(71) Applicant: ABB Technology AG, Zürich (CH)

(72) Inventors: Stefan Kämpfer, Mannheim (DE); Klaus Kaufmann, Mannheim (DE); Richard Bornhoffer, Mannheim (DE); Karlheinz Kraft, Plankstadt (DE); Patrick Komischke, Cary, NC (US); Saikat Ghosh, Dietzenbach (DE); Jens-Olaf Schneider, Ladenburg (DE)

(73) Assignee: ABB Technology AG, Zurich (CH)

( * ) Notice: Subject to any disclaimer, the term of this patent is extended or adjusted under 35 U.S.C. 154(b) by 220 days.

(21) Appl. No.: 13/657,152

(22) Filed: Oct. 22, 2012

(65) Prior Publication Data

US 2013/0044406 A1 Feb. 21, 2013

Related U.S. Application Data

(63) Continuation of application No. PCT/EP2011/056009, filed on Apr. 15, 2011.

(30) Foreign Application Priority Data

Apr. 21, 2010 (DE) .......................... 10 2010 017 899  
May 17, 2010 (DE) .......................... 10 2010 020 719

(51) Int. Cl.  
*H02B 7/08* (2006.01)  
*H02B 3/00* (2006.01)

(52) U.S. Cl.  
CPC ... *H02B 7/08* (2013.01); *H02B 3/00* (2013.01)  
USPC ........... 361/603; 361/601; 361/602; 361/620; 361/623

(58) Field of Classification Search  
USPC ......... 361/600, 601, 602, 603, 605, 620, 622, 361/623, 641, 643; 307/142, 147; 200/48 A, 200/48 R, 48 P; 312/223.2  
See application file for complete search history.

(56) References Cited

U.S. PATENT DOCUMENTS 1,986,619 A       1/1935    Blake  
3,345,449 A   *  10/1967    Hiller ........................... 174/16.1  
(Continued)

FOREIGN PATENT DOCUMENTS

CH        000682961 A5 * 12/1993    ............. E04B 1/343  
CN        201 230 147 Y      4/2009  
(Continued)

OTHER PUBLICATIONS

International Search Report (PCT/ISA/210) issued on Feb. 17, 2012, by the European Patent Office as the International Searching Authority for International Application No. PCT/EP2011/056009.

(Continued)

*Primary Examiner* — Michail V Datskovskiy  
(74) *Attorney, Agent, or Firm* — Buchanan Ingersoll & Rooney PC

(57) ABSTRACT

A transformer station for high and medium voltages is installed beneath the earth's surface, with at least one access point to the switchgear assembly and the ventilation shafts being arranged above ground. The station includes at least one power transformer for converting high voltage to medium voltage, at least one medium-voltage switchgear assembly and auxiliary and secondary as well as protection and control devices, and at least one access or transport shaft configured for transporting all large equipment and operating means into the station and can be used as an exhaust air shaft. The access or transport shaft has ventilation channels and a movable closure element. A base surface for placing the operating means and power transformers is provided beneath the access shaft. The power transformers can be inserted into boxes, which may be adjacent to one another, once the power transformers have been placed on the base surface.

23 Claims, 10 Drawing Sheets

(56) References Cited

U.S. PATENT DOCUMENTS

| | | | |
|---|---|---|---|
| 3,755,637 A * | 8/1973 | Gloviak et al. | 200/302.1 |
| 5,648,888 A * | 7/1997 | Le Francois et al. | 361/603 |
| 6,195,253 B1 * | 2/2001 | Fahlgren et al. | 361/603 |
| 6,233,137 B1 * | 5/2001 | Kolos et al. | 361/603 |
| 6,853,541 B2 * | 2/2005 | Anheuer et al. | 361/602 |
| 2006/0181837 A1 * | 8/2006 | Sun et al. | 361/602 |

FOREIGN PATENT DOCUMENTS

| | | | | |
|---|---|---|---|---|
| DE | 1 964 787 U | | 7/1967 | |
| DE | 2 230 689 | | 6/1974 | |
| DE | 29 15 504 | A1 | 10/1980 | |
| DE | 92 13 806 | U1 | 5/1993 | |
| DE | 42 10 901 | A1 | 10/1993 | |
| DE | 298 04 893 | U1 | 4/1999 | |
| EP | 1 435 681 | A1 | 7/2004 | |
| EP | 002075886 | A1 * | 7/2009 | H02B 7/08 |

OTHER PUBLICATIONS

Bert Strassburger et al., "Modern Subterranean Substations in GIS Technology—Challenges and Opportunities in Managing Demographic Change and Infrastructure Requirements", Siemens, Power-Gen Middle East, Nov. 11, 2008, pp. 1-15, XP-55017806.

ABB AG, "Substations That Can Hide in a City Underground Solutions Concepts", Power and Productivity for a Better World, Feb. 1, 2011, p. 3, XP-55017808, retrieved from the Internet: URL:http://www05.abb.com/global/scot/scot221.nsf/veritydisplay/adf28calfbe93959c12578b0002efb32/$file/ugss-e2_final.pdf.

* cited by examiner

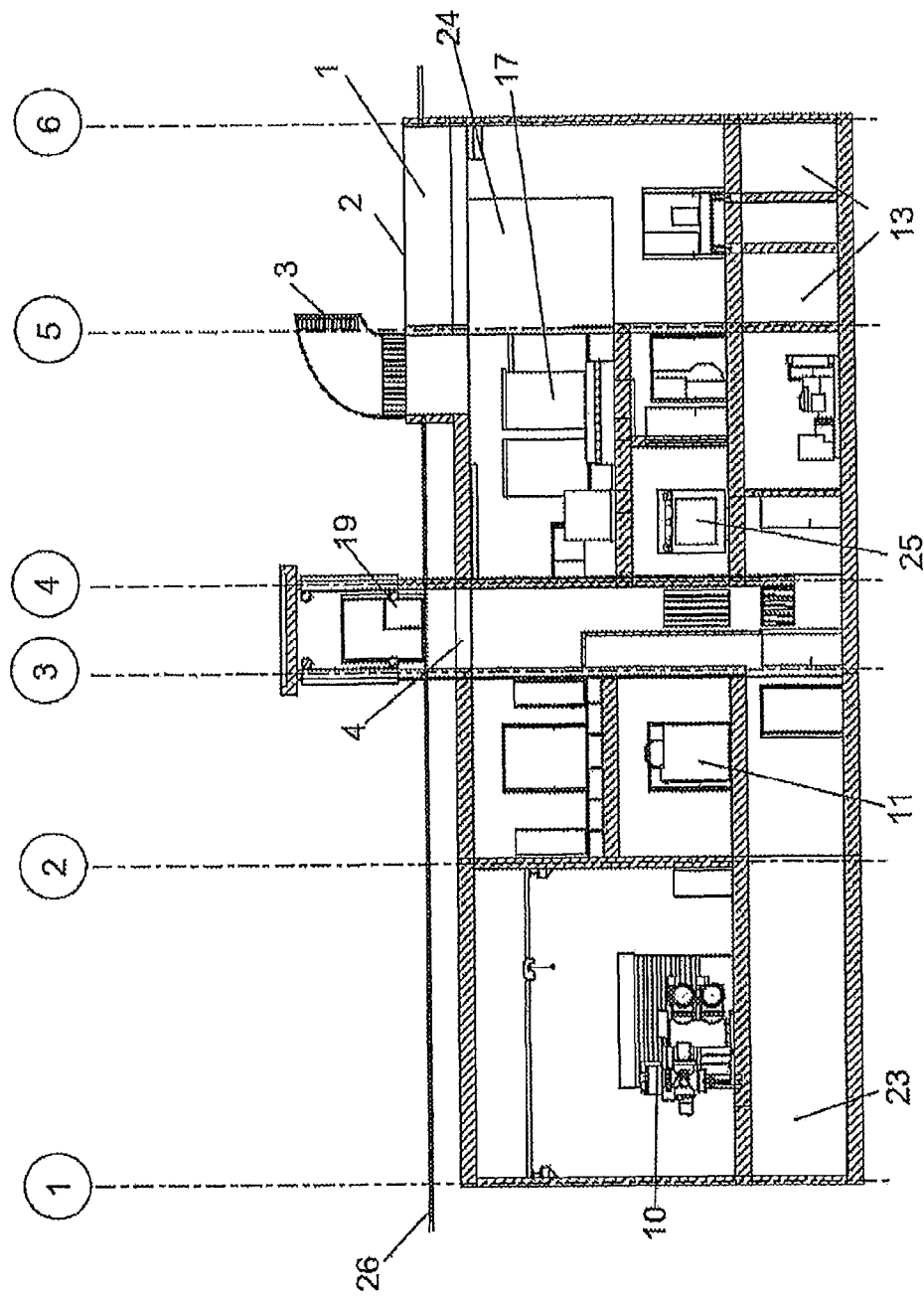

UNDERGROUND TRANSFORMER STATION FOR HIGH AND MEDIUM VOLTAGE

RELATED APPLICATIONS

This application claims priority as a continuation application under 35 U.S.C. §120 to PCT/2011/056009, which was filed as an International Application on Apr. 15, 2011 designating the U.S., and which claims priority to European Application 102010017899.3 filed in Europe on Apr. 21, 2010 and European Application 102010020719.5 filed in Europe on May 17, 2010. The entire contents of these applications are hereby incorporated by reference in their entireties.

FIELD

The present disclosure relates to a switchgear-assembly or transformer stations for high and medium voltages which are installed underground and which include power transformers for converting high voltage into medium voltage, and a medium-voltage switchgear assembly. The present disclosure also relates to a high-voltage switchgear assembly which is provided as part of the transformer station, and which is configured as a gas-isolated switchgear assembly.

BACKGROUND INFORMATION

Installation of switchgear assemblies, such as gas-insulated switchgear assemblies, at least partially underground is known, for example, from DE 4210901A1. The switchgear assembly designed as a compact station according to DE 4210901A1 is integrated in a reinforced-concrete chamber which is partially recessed in the earth and has corresponding ventilation options on the upper face of the chamber for connection between the interior of the chamber and the atmosphere.

DE 2915504A1 discloses a chamber with a cast foundation for an accessible electrical power supply station which is at risk of explosion and has a transformer and a switchgear assembly which is protected against interference arcs and is arranged on a false floor. A ventilation duct which is routed beneath the transformer and is connected to the external air via an air shaft is provided between the false floor and the foundation. An expansion space is also provided between the false floor and the foundation, that is to say above and below the switchgear assembly. The boundary walls of the expansion space have pressure-relief openings and are connected to the ventilation duct and/or an exhaust-air opening in the roof or in the upper part of a side wall of the chamber.

DE 298 04 893 U1 discloses a transformer station for medium and low voltages, a transformer and also a medium- and a low-voltage component being arranged in the housing of the transformer station. The transformer station also has a transportation opening in the roof of the housing. The transportation opening facilitates installation of the devices of the transformer station and maintenance of the devices.

In order to make access and transportation as well as servicing of the power transformers of transformer stations convenient, the power transformers are usually arranged at ground level.

If, however, the power transformers are arranged underground, a dedicated access point is usually provided for each transformer. The access point does not have a structure built over it, in order to allow permanent access to the transformer. Furthermore, separate devices for ventilation and climate control are provided to ensure the functionality of the switchgear assembly or transformer stations.

In the case of the transformers being arranged by being partially or completely recessed in the earth, they may also be covered only by protective grids or similar devices in order to, on the one hand, provide a mechanical protective function, but, on the other hand, to allow air flow for cooling purposes.

The above-described known designs of a switchgear assembly or transformer stations relate essentially to compact stations but not to larger transformer stations. Furthermore, the described concepts do not provide the option of a structure being built over the entire station since access to the power transformer is to be ensured and the space required aboveground by the switchgear assemblies or transformer stations is very large owing to the dedicated access points to the respective power transformer. In addition, a large enough space requirement has to be provided for the requisite ventilation shafts.

An objective of the underground station of the present disclosure is to minimize the openings and the above-ground space requirement. Furthermore, it should be possible to build a structure over the station and also to integrate the station in public spaces.

Considerable safety risks to the environment arise if transformers are merely recessed in the earth. The present disclosure largely avoids safety risks to, for example, adjacent public spaces owing to being structurally separate. It additionally permits complete visual integration into an urban environment and minimizes the influence of the assembly on the environment.

SUMMARY

An exemplary embodiment of the present disclosure provides a transformer station for high and medium voltages which is installed beneath the earth's surface. At least one access point to the switchgear assembly and ventilation shafts are arranged above-ground. The exemplary transformer station includes power transformers configured for converting high voltage into medium voltage, and at least one medium-voltage switchgear assembly, and at least one auxiliary, secondary and protection and control devices. The exemplary transformer station also includes an access and transportation shaft which is configured for transporting operating means which are to be installed into the station. The access and transportation shaft includes a moving closure element. In addition, the exemplary transformer station includes a base surface for holding the operating means and the transformers, the base surface being provided beneath the access and transportation shaft. The access and transportation shaft has a common transportation opening for transporting the transformers into the transformer station and is configured to be used as an exhaust-air shaft. The access and transportation shaft has ventilation ducts which ensure air guidance and constitute a physical termination of the shaft. The transformers, after being placed on the base surface, are configured to be moved into boxes for accommodating the transformers, the boxes being closeable. In addition, coolers provided for the transformers are configured to be removed from the transformer tank and arranged outside the transformer boxes.

BRIEF DESCRIPTION OF THE DRAWINGS

Additional refinements, advantages and features of the present disclosure are described in more detail below with reference to exemplary embodiments illustrated in the drawings, in which:

FIG. 10 shows a sectional view through the transformer station according to section line F-F.

DETAILED DESCRIPTION

Figure 1:
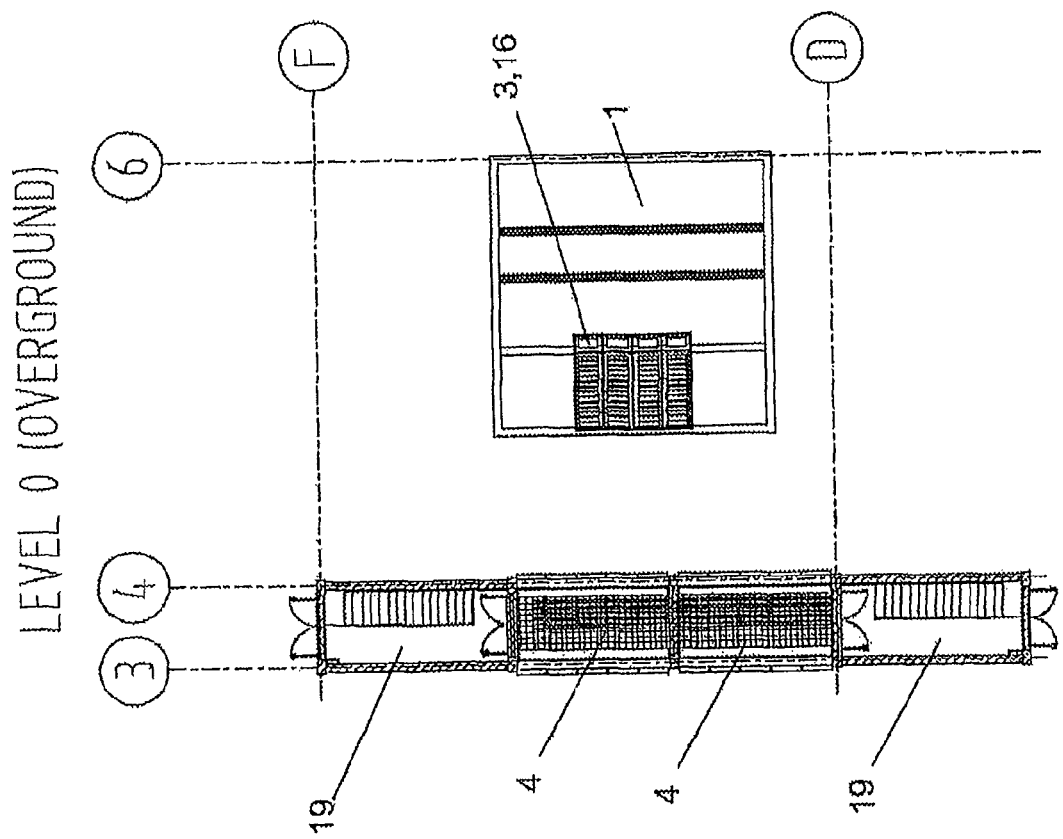
FIG. 1 shows an example of a ground plan of a first above-ground subregion of a transformer station according to an exemplary embodiment of the present disclosure.

Exemplary embodiments of the present disclosure provide a switchgear-assembly or transformer station which includes all the requisite auxiliary and secondary and protective and control devices, and which avoids the abovementioned disadvantages by reducing the above-ground space requirement of the station and also avoids the considerable safety risks to the environment owing to transformers of the station being arranged above-ground.

Exemplary embodiments of the present disclosure provide a switchgear-assembly (e.g., gas-insulated) or transformer station for high and medium voltages of the kind cited in the introductory part. Advantageous refinements of and improvements to the switchgear-assembly or transformer station according to the present disclosure and also the use of a high-voltage switchgear assembly as part of the transformer station are explained in more detail below.

Exemplary embodiments of the present disclosure provide a switchgear-assembly or transformer station which is installed underground. The exemplary switchgear-assembly or transformer station includes power transformers for converting a high voltage into medium voltage and also a medium-voltage switchgear assembly. In accordance with an exemplary embodiment, a high-voltage switchgear assembly is provided as part of the transformer station. The switchgear assemblies used in the transformer station can be designed as air- or gas-insulated switchgear assemblies, for example.

The transformer station according to the present disclosure is equipped with all the requisite auxiliary and secondary and also protective and control devices. In accordance with an exemplary embodiment, the transformer station may be installed largely or completely underground, with only the access points to the switchgear assembly, and the ventilation (e.g., feed-air) shafts may be arranged above-ground. The exemplary transformer station may also have the following features.

A common access and transportation shaft is provided in order to allow access to the switchgear assembly. The shaft is configured (e.g., suitable for) transporting all large items of equipment and operating means, such as power and auxiliary transformers, high-voltage switchgear assemblies and medium-voltage switchgear assemblies as well as cooling and climate-control devices, into the station. In addition, the access and transportation shaft can be used as an exhaust-air shaft during operation of the station. To this end, the shaft has corresponding ventilation ducts which firstly ensure advantageous air guidance and secondly constitute the physical termination of the shaft. In accordance with an exemplary embodiment, the access and transportation shaft can be equipped with a closure element which can be removed as required, for example, for replacing large operating means during maintenance of the switchgear assembly, in order to thus ensure easy access to the operating means.

An opening, for example with a flap, can be provided in the closure of the shaft for relatively small items of equipment, for example for servicing, maintenance or test purposes. This opening can likewise be used for the purpose of exchanging oil or treating oil of the transformers.

A base surface is located beneath the access shaft. The base surface is provided for holding the operating means, for example, the power transformers, after they are introduced through the shaft. After the transformers are placed on the base surface, they can be moved into, for example, adjoining, boxes which are provided for this purpose. This has the advantage that the space requirement for transportation of the transformers is minimized and only a common transportation opening has to be provided. Furthermore, the boxes are arranged such that direct access to each individual transformer is ensured. The base surface for holding the operating means can also be used for installation and servicing work within the station.

In accordance with an exemplary embodiment of the present disclosure, a moving platform, also called a lifting device below, is integrated in the described base surface, it being possible to use the platform to raise and lower the operating means, for example, the power transformers. The lifting device can also be used to position or introduce material and/or operating means at any intended level. In this case, the lifting device can operate in a hydraulic manner, wherein the device is lifted and lowered in steps or continuously.

If the switchgear-assembly station or transformer station is located completely underground and/or a structure is built over the entire station, a hall or a large space, which is integrated in the building which is built over the station, having an access point to suitable transportation paths, is provided above the common transportation shaft. The hall allows power transformers to be introduced via the access point. The operating means, for example, the power transformers, are lowered into the station by means of the described platform. During operation of the station, the hall or the large space can be used as part of the structure which is built above the station, for example, as a public area. The transformers which are located in the switchgear assembly and other operating means and items of equipment, for example, switchgear cabinets, are again replaced through the hall or the large space and via the transportation shaft by means of the existing transportation platform.

In accordance with an exemplary embodiment of the present disclosure, attachment points or structures for lifting and lowering devices, for example block and tackle systems, are provided in the hall.

On account of the fact that the above-ground part of the switchgear-assembly station or transformer station is restricted only to a common feed-air shaft, the access points and emergency exits for personnel by means of stairways and the described combined transportation and exhaust-air shaft, the above-ground space requirement of the station is minimized.

The common feed-air shaft supplies the entire station with fresh air. The feed-air shaft can be of redundant design, so that while servicing work is being carried out, the ventilation system of the station continues to operate under full-load. Provision is also made for the fans required in the station and also sand filters and damping devices to be arranged within the feed-air shaft such that servicing can be carried out within the station by means of designated doors.

In order to minimize safety risks during operation of the switchgear assembly, the transformers are arranged in boxes which are substantially closed. The boxes can be physically closed by prefabricated components which can be quickly removed if the transformers need to be replaced and, at the same time, meet the necessary fire-protection requirements. Furthermore, coolers which are provided for the transformers may be removed from the actual transformer tank and arranged outside the transformer boxes, which allows the ventilation openings in the actual transformer box to be minimized. This arrangement provides, for example, from a safety aspect, that the potential for danger of the transformer in a defined volume or fire zone is largely precluded or automatic closing of the ventilation openings in the event of a fire or damage is ensured. Separation within the oil circuit takes place by means of automatic valves which are introduced into pipelines of the oil circuit.

In accordance with an exemplary embodiment, the respective transformer box is equipped with an automatic extinguishing device.

The coolers of the transformers are arranged in a so-called ventilation region. Requisite climate-control devices and the like are likewise arranged here. The requisite feed air is routed from the common feed-air shaft to the coolers and the climate-control devices by means of feed-air ducts. This arrangement allows for targeted and advantageous feed flow and therefore efficient cooling of the transformers. In the event of a fire or damage, provision is further made for it to be possible for the affected cooling region to be automatically separated from the rest of the station or the rest of the cooling region by means of fire-protection doors, so as to ensure that the station can continue to operate. The above-described division into separate dedicated fire-protection zones therefore allows the highest level of availability of the station.

Cable shafts are provided, for example, at all corners of the station, in order for the power cables to be flexibly fed to the station from the outside. The power cables are fed to the switchgear assemblies by means of the cable shafts via a deeper-lying cable vault.

According to an exemplary embodiment of the present disclosure, the switchgear-assembly spaces can also have a pressure-relief device of the following design.

In the case of designated pressure relief into the area surrounding the switchgear assembly, the pressure-relief ducts are routed into a region in which there is no risk of injury to personnel.

In the case of designated pressure relief within the station, the pressure-relief ducts are routed into the cable vault and equipped with absorber devices.

Owing to the above-described refinements of the pressure-relief device, this also ensures safety of the switchgear assembly in the case of a limited space volume.

In accordance with an exemplary embodiment of the station according to the present disclosure, the transformers are designed as dry transformers, as a result of which a saving is made in respect of the area of the switchgear-assembly station which is to be built on, in addition to the minimization of the requisite fire-protection and safety measures.

Owing to the underground installation of the switchgear-assembly station, only access points and ventilation shafts may be installed above ground, and therefore the available space is minimized and is available for other uses, for example to be built over, for example, in densely populated inner cities.

The present disclosure and advantageous refinements of and improvements to the disclosure will be explained in greater detail and described with reference to exemplary embodiments which are illustrated in the following figures. In this case, FIGS. 1 to 10 show various sectional illustrations of an exemplary transformer station.

FIG. 1 illustrates a first subregion of the transformer station which is located above the ground edge 26 of the station and is called level 0. The first subregion includes two access points 19 for the switchgear assembly, feed-air shafts 4 and an access and transportation shaft 1 which is configured (e.g., suitable) for transporting all large items of equipment and operating means, for example, power and auxiliary transformers, high-voltage switchgear assemblies and medium-voltage switchgear assemblies and also cooling and climate-control devices, to the various levels of the station. In an exemplary embodiment, publically accessible spaces, for example, can be built over the above-ground subregion of the station or the above-ground subregion can be integrated in the publically accessible spaces in order that additional ground surface area is not taken thereby, for example, in urban areas.

Provision is also made to use the access and transportation shaft 1 as an exhaust-air shaft 16 during operation of the station. To this end, the exhaust-air shaft 16 has corresponding exhaust-air ducts 3 which ensure advantageous air guidance and also constitute the physical termination of the shaft 1.

Figure 2:
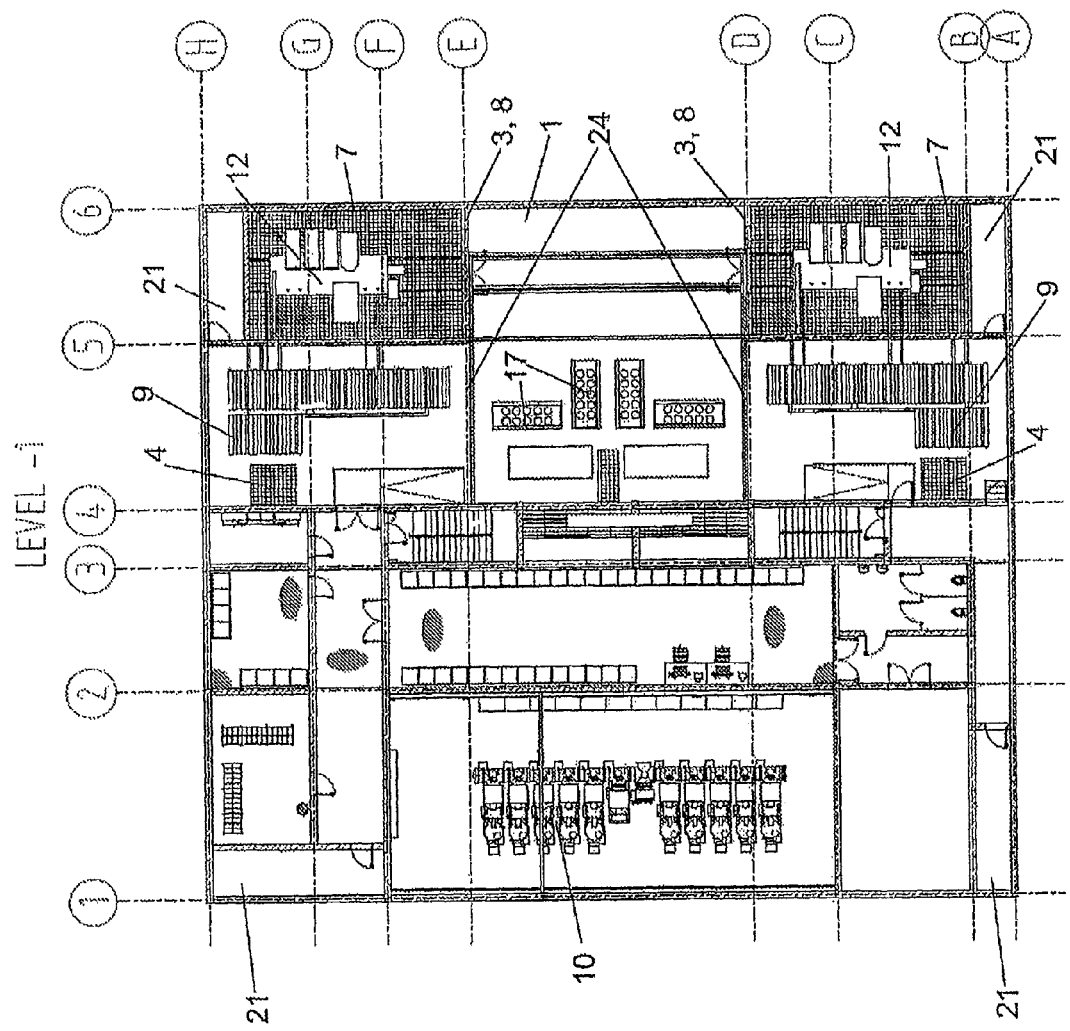
FIG. 2 shows an example of a ground plan of a first underground level of a transformer station according to an exemplary embodiment of the present disclosure.

FIG. 2 shows an exemplary ground plan of a first underground level of the station which is called level −1. In addition to the access and transportation shaft 1, a portion of the high-voltage switchgear assembly 10 and two power transformers 12 are arranged in level −1. The transformers 12 are moved into boxes 7 which are provided for this purpose. The boxes 7 are arranged such that direct access to each transformer 12 is ensured. Since the high-voltage switchgear assembly 10, the boxes 7 for accommodating the transformers 12 and the power transformers 12 extend over two levels, they are once again shown in FIG. 3.

The coolers 9 which are provided for cooling the transformers 12 are removed from the oil-filled body of the transformers 12 and are arranged outside the transformer box 7, which allows the ventilation openings 8 in the actual transformer box 7 to be minimized. The design of the ventilation openings 8 allows the ventilation openings 8 to be automatically closed in the event of a fire or damage. The coolers 9 of the transformers 12 are further arranged such that, in the event of a fire or damage, the affected cooling region with the correspondingly cooling devices 9 for the respective transformers 12 can be automatically separated from the rest of the station or the rest of the cooling region of the unaffected transformers 12 by means of fire-protection doors 24.

The feed-air shaft 4, which may be of redundant design, supplies the entire station with fresh air by means of its connection to the above-ground region of the switchgear assembly.

In order to ensure that the power cables are flexibly fed to the station from the outside, cable shafts 21 are provided at all corners of the station. The power cables are fed to the switchgear assemblies 10, 11 by means of the cable shafts 21 via a deeper-lying cable vault 23 (illustrated in FIG. 4).

Figure 3:
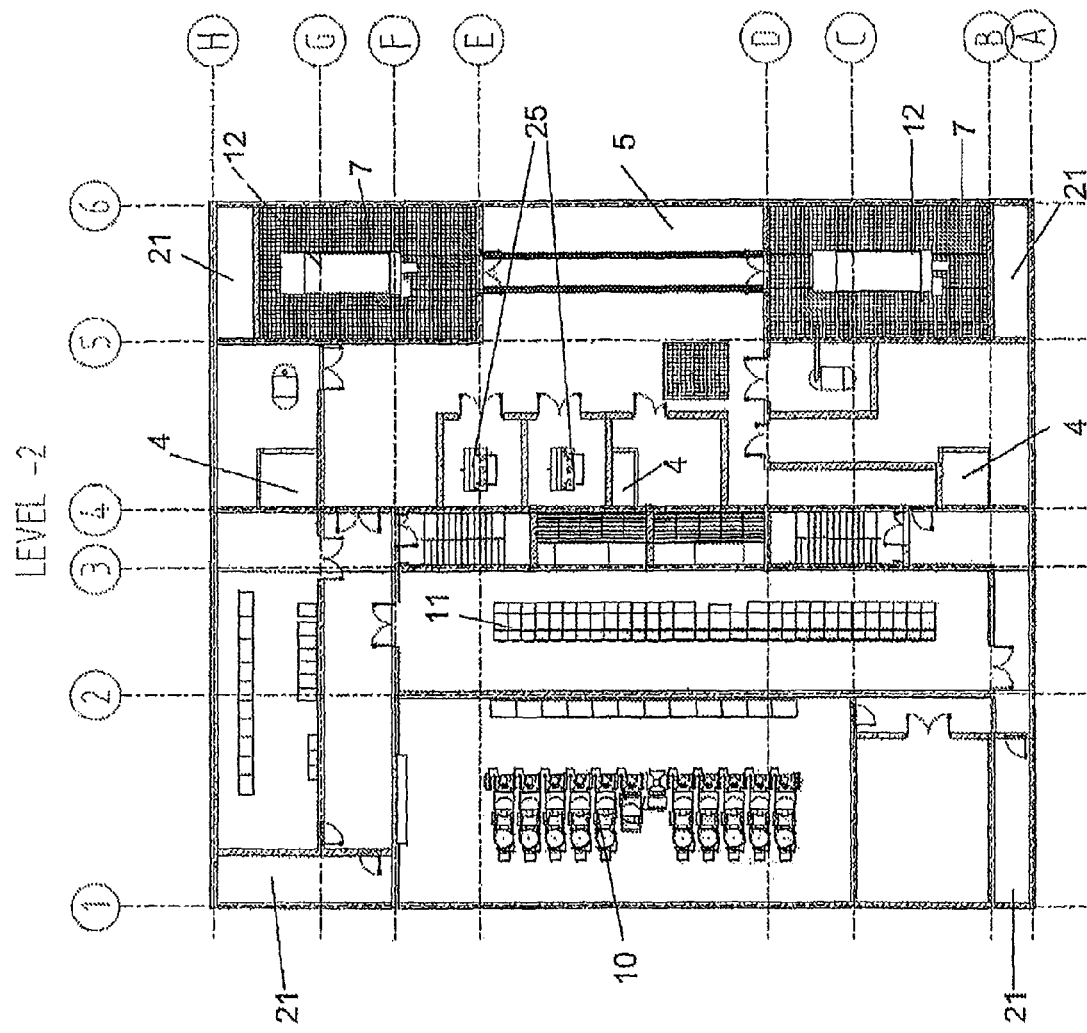
FIG. 3 shows an example of a ground plan of a second underground level of a transformer station according to an exemplary embodiment of the present disclosure.

FIG. 3 shows an exemplary ground plan of a second underground level of the station which is arranged below the first underground level of the station and is called level −2. In addition to the cable shafts 21 which are routed out of level −1, the power transformers 12, the high-voltage switchgear assembly 10 and the feed-air shafts 4, two auxiliary transformers 25 and a medium-voltage switchgear assembly 11 are accommodated in level −2.

FIG. 3 also shows a base surface 5 which is located below the access shaft 1 and is provided for holding and/or temporarily storing operating means, for example, the power transformers 12, after they are introduced through the shaft 1. The space above the base surface 5 is equipped with a lifting device which can be used to raise and lower the operating means, for example, the power transformers 12.

Figure 4:
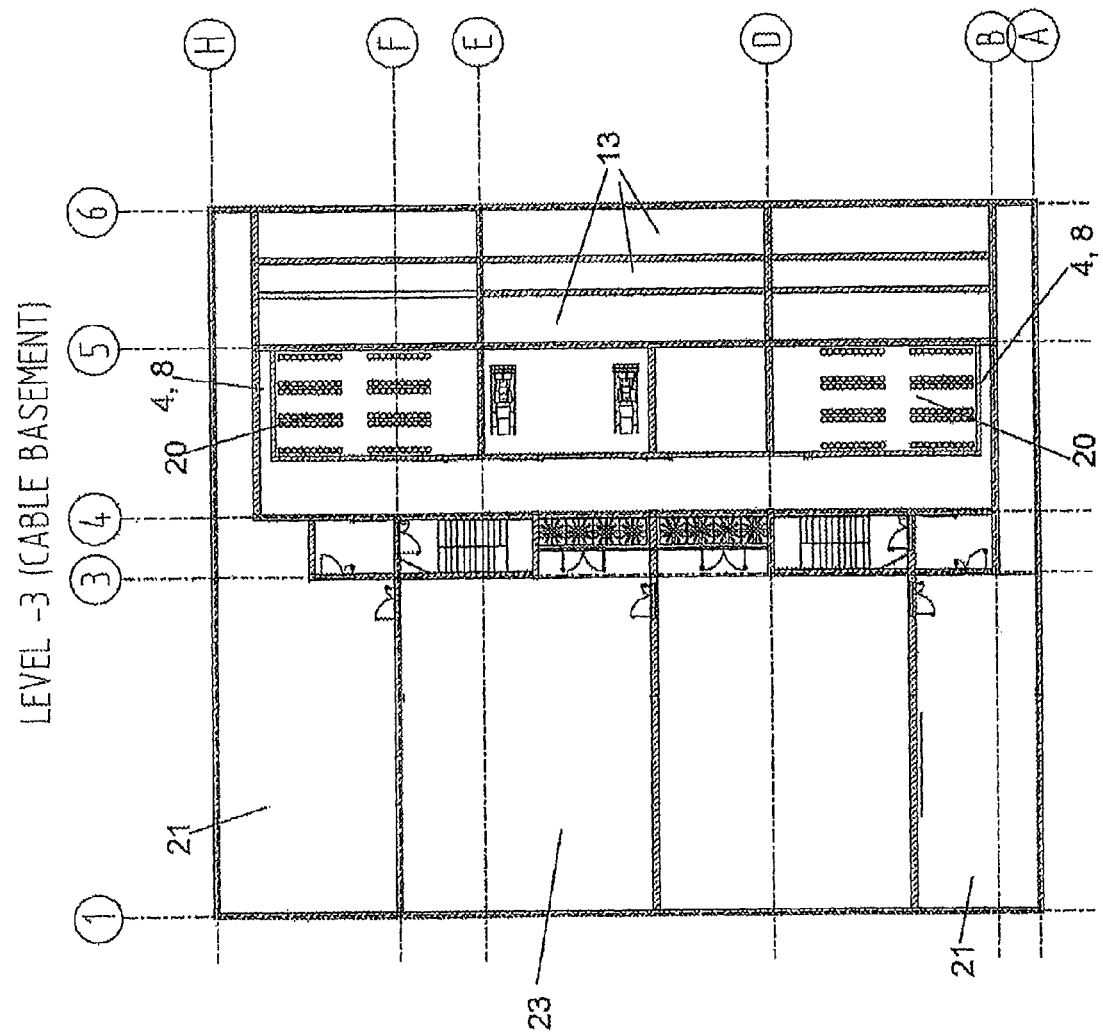
FIG. 4 shows an example of a ground plan of a third underground level of a transformer station according to an exemplary embodiment of the present disclosure.
Figure 5:
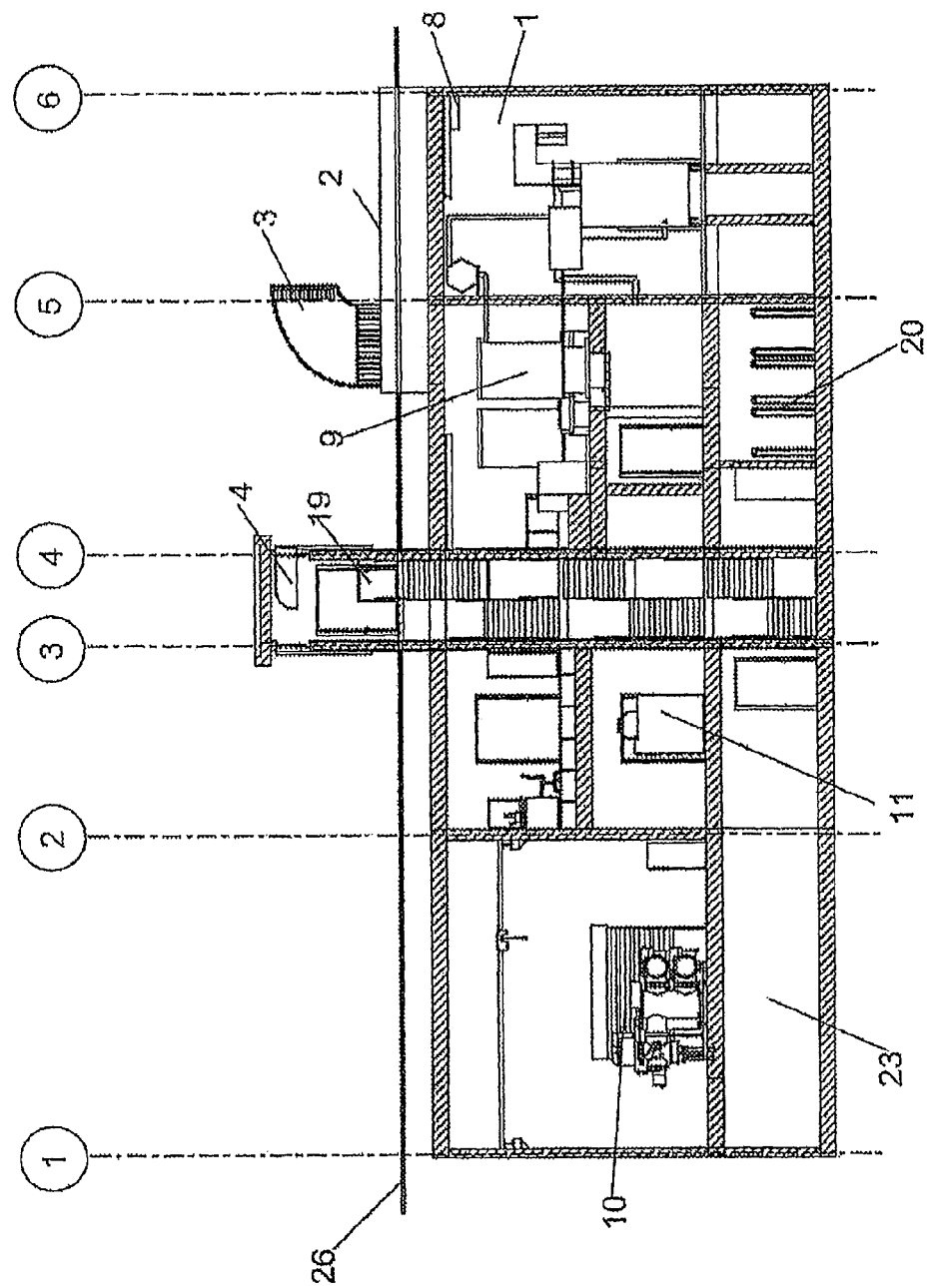
FIG. 5 shows a sectional view through the transformer station according to section line A-A.
Figure 6:
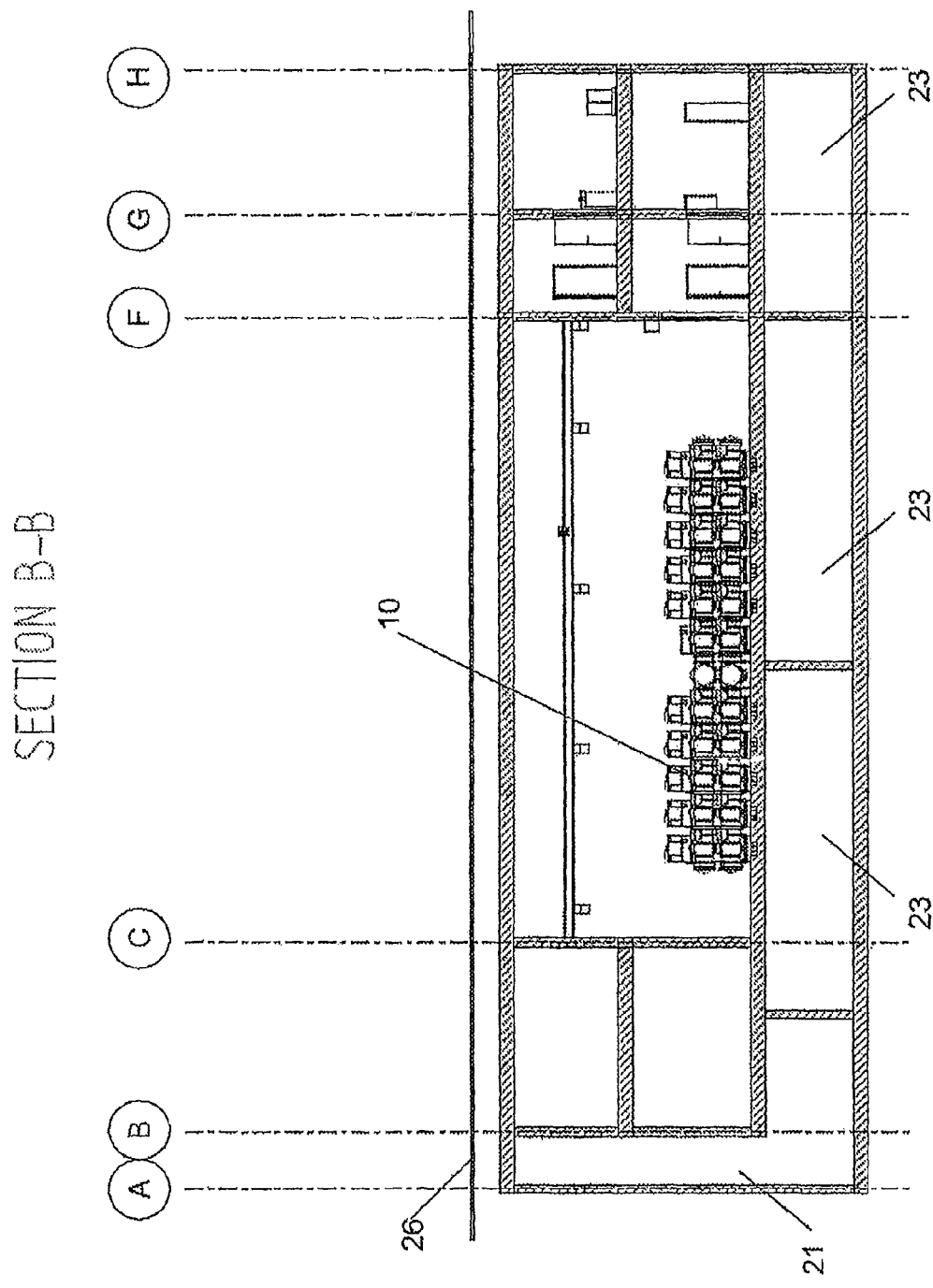
FIG. 6 shows a sectional view through the transformer station according to section line B-B.
Figure 7:
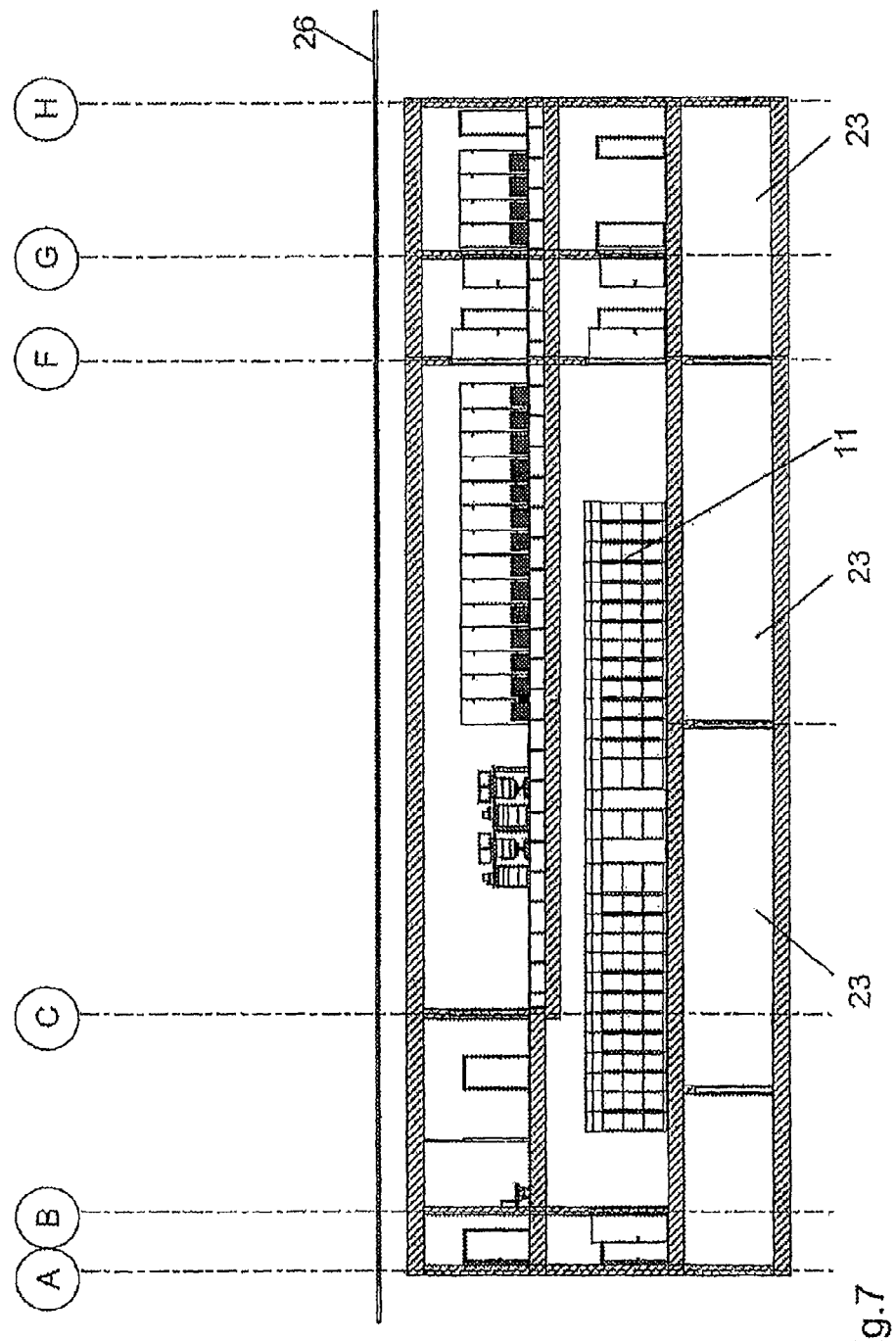
FIG. 7 shows a sectional view through the transformer station according to section line C-C.
Figure 8:
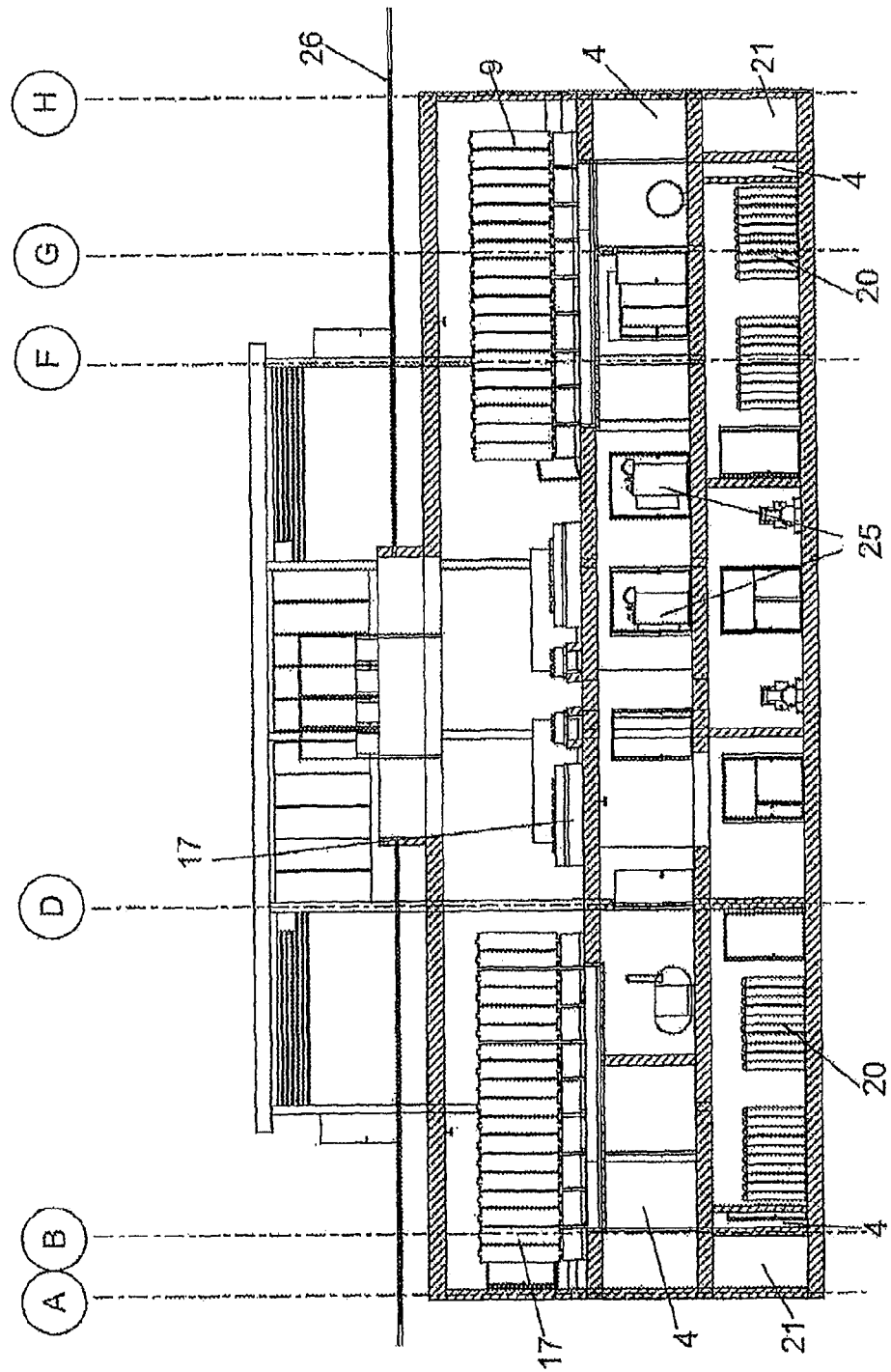
FIG. 8 shows a sectional view through the transformer station according to section line D-D.
Figure 9:
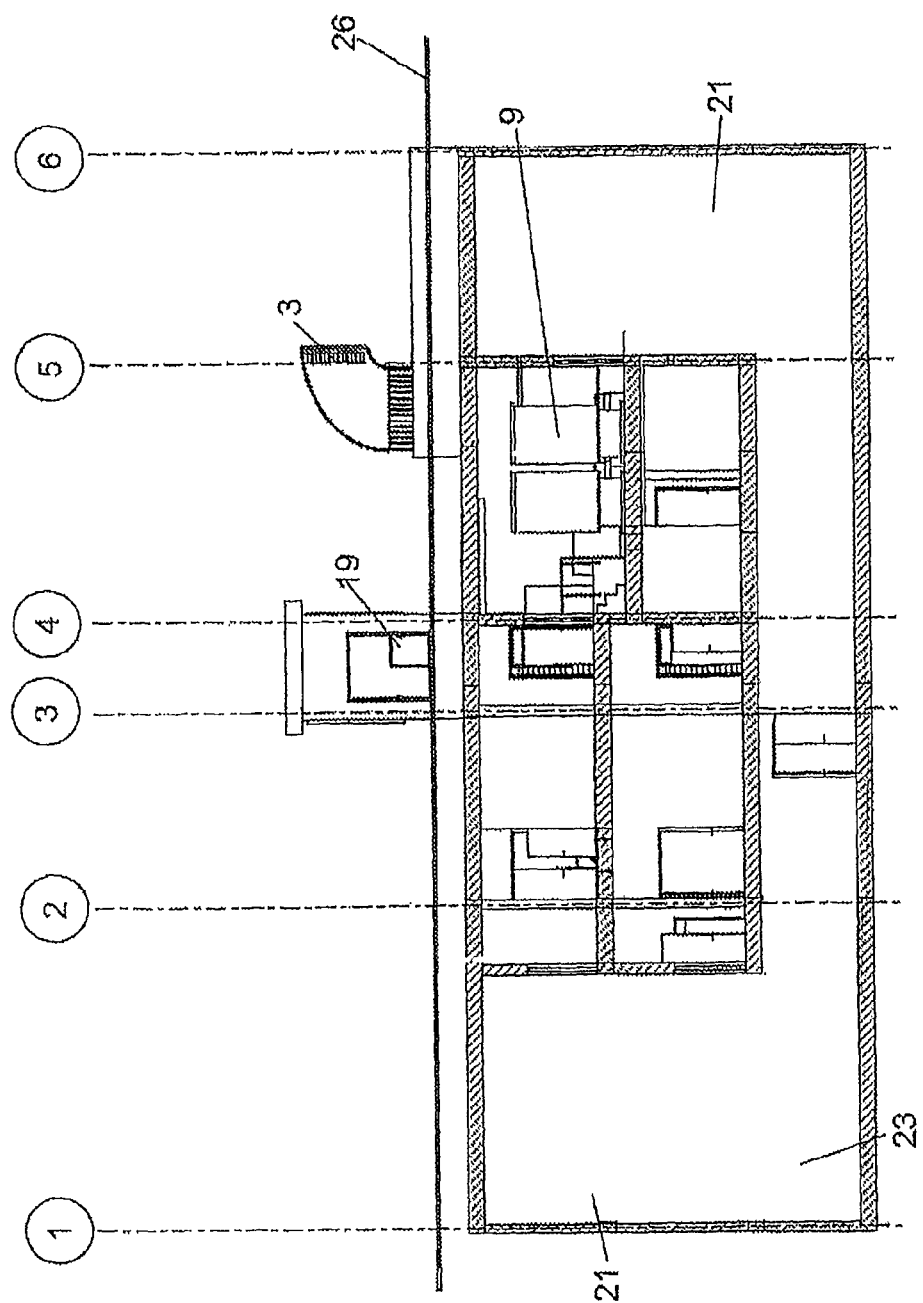
FIG. 9 shows a sectional view through the transformer station according to section line E-E.

FIG. 4 shows an exemplary ground plan of a third underground level of the station which is called level −3. In level −3, oil sumps 13 are provided beneath the transformers 12. The oil sumps 13 capture transformer oil which runs out of the transformers 12 in the event of damage. The transformers 12 are also equipped with an automatic extinguishing device 20, the extinguishing means thereof likewise being stored in level −3.

A cable vault 23 and the associated cable shafts 21 are accommodated in level −3. The power cables laid in the station are fed from the cable vault 23, which is located in level −3, to the switchgear assemblies 10, 11 by means of the cable shafts 21.

The climate-control devices 17 which are likewise required are arranged in the ventilation region above the ventilation shaft 4 and the feed-air ducts 4.

FIGS. 5 to 10 shows various sectional views according to section lines A-A, B-B, C-C, D-D, E-E and F-F from FIGS. 1 to 4, wherein the reference symbols indicated in the sectional views have been taken from FIGS. 1 to 4.

LIST OF REFERENCE SYMBOLS

1 Access and transportation shaft
2 Closure element
3 Exhaust-air duct
4 Ventilation shaft, feed-air shaft, feed-air duct
5 Base surface for holding operating means
7 Boxes for accommodating transformers
8 Ventilation openings in the boxes
9 Coolers for the transformers
10 High-voltage switchgear assembly
11 Medium-voltage switchgear assembly
12 Power transformers
13 Oil sumps
16 Exhaust-air shaft
17 Climate-control devices
19 Access point to the station
20 Central extinguishing device
21 Cable shaft
23 Cable vault
24 Fire-protection door
25 Auxiliary transformer
26 Upper edge of the ground, ground edge

What is claimed is:

1. A transformer station for high and medium voltages which is installed beneath the earth's surface, wherein at least one access point to the switchgear assembly and ventilation shafts are arranged above-ground, comprising:
   power transformers configured for converting high voltage into medium voltage;
   at least one medium-voltage switchgear assembly, and at least one auxiliary, secondary and protection and control devices;
   an access and transportation shaft which is configured for transporting operating means which are to be installed into the station, the access and transportation shaft including a moving closure element; and
   a base surface for holding the operating means and the transformers, the base surface being provided beneath the access and transportation shaft, wherein:
   the access and transportation shaft has a common transportation opening for transporting the transformers into the transformer station and is configured to be used as an exhaust-air shaft, the access and transportation shaft having ventilation ducts which ensure air guidance and constitute a physical termination of the shaft;
   the transformers, after being placed on the base surface, are configured to be moved into boxes for accommodating the transformers, the boxes being closeable; and
   coolers provided for the transformers are configured to be removed from the transformer tank and arranged outside the transformer boxes.

2. The transformer station as claimed in claim 1, wherein the closure element is configured to be removed.

3. The transformer station as claimed in claim 1, comprising:
   an opening in the access and transportation shaft,
   wherein the opening enables oil to be exchanged or treated in the transformers.

4. The transformer station as claimed in claim 1, wherein the base surface is configured to position the operating means and includes a moving platform.

5. The transformer station as claimed in claim 1, comprising:
   a large space integrated in the structure through which access to the access and transportation shaft is provided when a structure is built over the entire station.

6. The transformer station as claimed in claim 5, wherein the structure built over the station is configured as a public-use area.

7. The transformer station as claimed in claim 1, comprising:
   at least one common feed-air shaft configured to supply fresh air to the station.

8. The transformer station as claimed in claim 7, comprising:
   at least one of fans, sand filters and damping devices arranged in the station,
   wherein the at least one of the fans, sand filters and damping devices are arranged within the feed-air shaft to enable servicing within the station by means of designated doors.

9. The transformer station as claimed in claim 1, wherein the boxes into which the transformers are arranged are configured to be closed by prefabricated components,
   wherein the prefabricated components are designed in compliance with fire-protection requirements.

10. The transformer station as claimed in claim 1, wherein the boxes are equipped with an automatic extinguishing device.

11. The transformer station as claimed in claim 1, wherein a cooling region of the station which is affected by fire or is damaged is configured to be automatically separated from the rest of the station or the rest of the cooling region by means of fire-protection doors to ensure continuous operation of the station.

12. The transformer station as claimed in claim 1, comprising:
a cable vault; and
at least one pressure-relief device including pressure-relief ducts,
wherein the pressure-relief ducts are routed into a cable vault of the station.

13. The transformer station as claimed in claim 1, wherein the boxes are arranged to adjoin one another.

14. The transformer station as claimed in claim 2, comprising:
an opening in the access and transportation shaft,
wherein the opening enables oil to be exchanged or treated in the transformers.

15. The transformer station as claimed in claim 3, wherein the base surface is configured to position the operating means and includes a moving platform.

16. The transformer station as claimed in claim 15, comprising:
a large space integrated in the structure through which access to the access and transportation shaft is provided when a structure is built over the entire station.

17. The transformer station as claimed in claim 16, wherein the structure built over the station is configured as a public-use area.

18. The transformer station as claimed in claim 16, comprising:
at least one common feed-air shaft configured to supply fresh air to the station.

19. The transformer station as claimed in claim 18, comprising:
at least one of fans, sand filters and damping devices arranged in the station,
wherein the at least one of the fans, sand filters and damping devices are arranged within the feed-air shaft to enable servicing within the station by means of designated doors.

20. The transformer station as claimed in claim 16, wherein the boxes into which the transformers are arranged are configured to be closed by prefabricated components,
wherein the prefabricated components are designed in compliance with fire-protection requirements.

21. The transformer station as claimed in claim 16, wherein the boxes are equipped with an automatic extinguishing device.

22. The transformer station as claimed in claim 16, wherein a cooling region of the station which is affected by fire or is damaged is configured to be automatically separated from the rest of the station or the rest of the cooling region by means of fire-protection doors to ensure continuous operation of the station.

23. The transformer station as claimed in claim 16, comprising:
a cable vault; and
at least one pressure-relief device including pressure-relief ducts,
wherein the pressure-relief ducts are routed into a cable vault of the station.

* * * * *